United States Patent [19]

Miyamoto et al.

[11] Patent Number: 5,293,411
[45] Date of Patent: Mar. 8, 1994

[54] NUCLEAR REACTOR POWER CONTROL METHOD AND DEVICE

[75] Inventors: Yoshiyuki Miyamoto; Fumio Mizuki; Yoshie Takashima, all of Hitachi, Japan

[73] Assignee: Hitachi, Ltd., Tokyo, Japan

[21] Appl. No.: 935,655

[22] Filed: Aug. 26, 1992

Related U.S. Application Data

[63] Continuation of Ser. No. 550,448, Jul. 10, 1990, abandoned.

[30] Foreign Application Priority Data

Jul. 14, 1989 [JP] Japan .................. 1-180349

[51] Int. Cl.$^5$ ............................................. G21C 7/32
[52] U.S. Cl. ..................... 376/210; 376/216; 376/217
[58] Field of Search ............ 376/216, 217, 210

[56] References Cited

U.S. PATENT DOCUMENTS

| | | | |
|---|---|---|---|
| 4,129,475 | 1/1978 | Spurgin et al. | 376/216 |
| 4,440,715 | 4/1984 | Sato et al. | 376/210 |
| 4,486,381 | 12/1984 | Hirukawa et al. | 376/210 |
| 4,605,530 | 8/1986 | Tatemichi | 396/237 |

OTHER PUBLICATIONS

Kenneth C. Lish, *Nuclear Power Plant Systems And Equipment*, 1972 by Industrial Press, pp. 39–40, Section 3.7.

Primary Examiner—Donald P. Walsh
Assistant Examiner—Frederick H. Voss
Attorney, Agent, or Firm—Fay, Sharpe, Beall, Fagan, Minnich & McKee

[57] ABSTRACT

Decreasing the speed of a pump supplying cooling water to the core in the boiling water type nuclear reactor based on a trip signal that is generated when a pump supplying feed water is tripped. This performs a first operation to decrease the nuclear reactor power to a first fixed value. A second operation lowers the nuclear reactor power to a second fixed value that is lower than the first fixed value and that prevents run-out of other first pumps in operation. The first fixed value is lower than the reactor power at the moment when the first pump is tripped. The steam flow is decreased substantially simultaneously with the decrease of the feed water flow. Thereby, the decrease of the steam flow is carried out in an early stage when the feed water pump is tripped and the possibility of nuclear reactor scram is reduced.

17 Claims, 13 Drawing Sheets

| GROUP NO. | POSITION OF CONTROL ROD IN MANIPULATION STEP | | | | | | | | | | | | | | | | | |
|---|---|---|---|---|---|---|---|---|---|---|---|---|---|---|---|---|---|---|
| | 8 | 9 | 10 | 11 | 12 | 13 | 14 | 15 | 16 | 17 | 18 | 19 | 20 | 21 | 22 | 23 | 24 | 25 |
| 21 | | 48 | | | | | | | | | | | | | | | | |
| 22 | | 6 | 8 | 10 | 12 | | | | | 10 | 12 | 14 | 16 | 18 | 20 | 22 | | |
| 23 | | 6 | 8 | 10 | 12 | | | | | | | | | | 14 | 16 | | |
| 24 | | 6 | 8 | 10 | | | | | | | | | | | 14 | 16 | | |
| 25 | | 6 | 8 | 10 | | | | | | | | | | | 12 | 14 | | |
| 26 | | | | | | 6 | 12 | 18 | 24 | 48 | | | | | | | | |
| 27 | | | | | | 6 | 12 | 18 | 24 | 48 | | | | | | | | |
| 28 | | | | | | 6 | 12 | 18 | 24 | 48 | | | | | | | | |
| 29 | | | | | | 6 | 12 | 18 | 24 | 48 | | | | | | | | |
| 30 | | | | | | 6 | 12 | 18 | 24 | 48 | | | | | | | | |

NUCLEAR REACTOR POWER CONTROL METHOD AND DEVICE

This application is a continuation of application Serial No. 07/550,448, filed Jul. 10, 1990, now abandoned.

BACKGROUND OF THE INVENTION

The present invention relates to a nuclear reactor power control method and a nuclear reactor power control device, in particular, for applying to a boiling water type nuclear reactor.

The boiling water type nuclear reactor comprises a feed water system including a turbine driven reactor feed water pump (TDRFP) and a motor driven reactor feed water pump (MD-RFP). In normal operation, with two turbine driven reactor feed water pumps, the feed water is supplied to the reactor. The motor driven reactor feed water pump is also used as a back-up for the turbine driven reactor feed water pump. When one turbine driven reactor feed water pump is abnormally tripped and the motor driven feed water pump is not started, the flow of feed water becomes short and a nuclear reactor scram is caused due to the decrease of water level of the nuclear reactor. Scram can be considered as a general plant trip.

It is known to control the power of a nuclear reactor by changing the flow of the recirculated water. This controls the amount of voids in the water between fuel elements and a void will absorb neutrons to a greater extent than water. Therefore a reduction in the recirculated water by reducing the speed of the core cooling fluid pump will increase the amount of voids and thus decrease the power.

A method for avoiding such nuclear reactor scram is explained in Japanese Patent Application Laid-Open No. 55114998(1980). When both the water level of the nuclear reactor decreases below a fixed level and a mismatching between the flow of the feed water supplied to the nuclear reactor and the flow of the steam discharged from the nuclear reactor appears, the method directly controls a recirculation flow control device with the mismatched amount and thereby decreases the nuclear reactor power. Thereafter, the flow of the steam decreases and the water level of the nuclear reactor rises. Thereby the nuclear reactor scram is avoided. This method detects the shortage of feed water flow due to non-start of the motor driven reactor feed water pump by measuring the water level drop of the nuclear reactor.

Further, although different from the abnormality example of the above feed water pump trip, Japanese Patent Application Laid-Open No. 49-37094 (1974) discloses a method for avoiding the nuclear reactor scram caused by the water level decrease of the nuclear reactor due to the decrease of feed water flow. The objective deals with the problem when there is a decrease of the feed water flow due to breakage of the feed water piping. The method is to lower the nuclear reactor power when both the feed water flow decreases below the steam flow by more than a fixed value and the water level of the nuclear reactor decreases from a normal water level by more than a fixed value. As the operations for lowering the nuclear reactor power, there are decreasing the speed of the recirculation pump and the insertion of selected control rods.

SUMMARY

An enlargement of the opening domain of the boiling water type nuclear reactor is now studying. The enlargement of the operating domain includes the hatched domain portion shown in FIG. 14 into the operation range of the nuclear reactor. Thereby the operation of the nuclear reactor at a low core flow and a high nuclear reactor power (for example, at a core flow of 85% and a nuclear reactor power of 100%) is enabled.

However, even if the operating domain is enlarged, there can occur the abnormal state as explained above, that is, the trip of one turbine driven reactor feed water pump and the non-start of the motor driven reactor feed water pump standing by. Therefore the inventors have studied the phenomenon appearing in the enlarged operating domain when the above abnormality occurred. As the result, under the condition that the nuclear reactor was operating in the enlarged operating domain, when the above abnormality happened, it was found out that the nuclear reactor possibly went to a scram even if the nuclear reactor power was lowered based upon the nuclear reactor water level and the mismatch between the feed water flow and the steam flow. The above study is explained below.

FIG. 15 shows a characteristic curve of the above nuclear reactor scram. This characteristic curve was taken when the above abnormality happened under the operating condition of a core flow of 85% and a nuclear reactor power of 100%, and the feed water flow suddenly decreases by the trip of one turbine driven reactor feed water pump. However since the non-start of the motor driven reactor feed water pump is determined by the nuclear reactor water level, the decrease of the nuclear reactor power is delayed. In particular, in the case where the determination is made based upon the mismatch between the feed water flow and the steam flow and based upon the nuclear reactor water level, such as disclosed in Japanese Patent Application Laid-Open No. 49-37094 (1974), the decrease of the nuclear reactor power is further delayed. For this reason, the initiation of the steam flow decrease is delayed, and the nuclear reactor water level lowers below a fixed value of nuclear reactor scram so that the nuclear reactor goes to scram as shown in FIG. 15(B).

One object of the present invention is to provide a nuclear reactor power control in which the decrease of the steam flow at the feed water pump trip is performed quickly and the possibility of the nuclear reactor scram is reduced.

Another object of the present invention is to provide a nuclear reactor power control in which an over decrease of the steam flow at the feed water pump trip is suppressed.

A further object of the present invention is to provide a nuclear reactor power control in which an overspeed, that is run out, of the feed water pump during its operation, which would produce a trip, is prevented.

A still further object of the present invention is to provide a nuclear reactor power control in which the control to lower the nuclear reactor power is facilitated after the decrease of a second pump that supplies cooling water to the core in the nuclear reactor.

One feature is to decrease the speed of a second pump supplying cooling water to the core in the nuclear reactor based on a trip signal that is generated when a first pump supplying feed water is tripped, and to thereby decrease the nuclear reactor power.

Another feature is to perform a first operation to decrease the speed of a second pump supplying cooling water to the core in the nuclear reactor based on a trip signal that is generated when a first pump supplying feed water is tripped to decrease the nuclear reactor power to a first fixed value and to perform a second operation to lower the nuclear reactor power to a second fixed value that is lower than the first fixed value.

A further feature is to reduce the nuclear reactor power to a level that prevents run-out of the other first pumps in operation.

Another feature is to switch a set value of the nuclear reactor power used for controlling the nuclear reactor power to a second fixed value that is lower than a first fixed value used at the moment when a first pump is tripped.

Since the second pump speed is reduced based upon a trip signal generated when the first pump is tripped, the steam flow is decreased substantially simultaneously with the decrease of the feed water flow. Thereby, the decrease of the steam flow is carried out in an early stage when the feed water pump is tripped and the possibility of nuclear reactor scram is reduced.

Since the first operation reduces the nuclear reactor power down to a first fixed value through reduction of the speed of the second pump and the second operation rapidly reduces the nuclear reactor power, that perform run-back, to a second fixed value lower than the first fixed value, the decreasing range of the nuclear reactor power by the speed reduction of the second pump is limited. Thereby, unnecessary enlargement of the decreasing range of the steam flow is suppressed.

Since the nuclear reactor power is decreased to a level that prevents the run-out of the other first pumps in operation, the run-out of the first pumps in the operation is prevented.

Since the set value of the nuclear reactor is switched to the second fixed value level lower than the first fixed value used at the trip of the first pump, the control to reduce the nuclear reactor power after the runback is facilitated.

BRIEF DESCRIPTION OF THE DRAWING

Further objects, features and advantages of the present invention will become more apparent from the following description of a preferred embodiment as shown in the accompanying drawing, wherein.

DETAILED DESCRIPTION OF THE INVENTION

Figure 1:
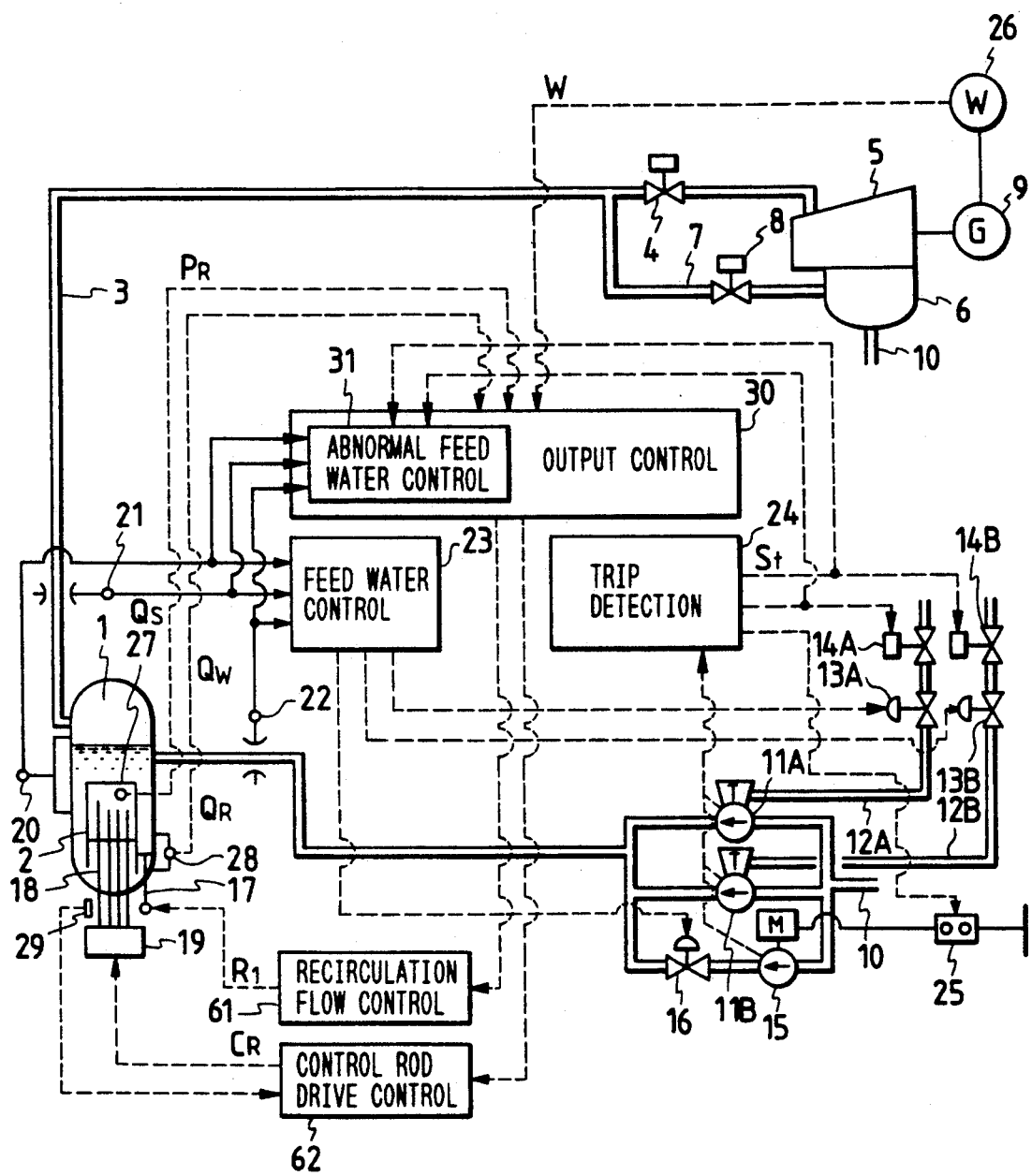
FIG. 1 is a diagram of a nuclear reactor power control device according to one preferable embodiment of the present invention, which is applied to a boiling water type nuclear reactor.

A nuclear reactor power control device of one preferred embodiment according to the present invention, which is applied to a boiling type nuclear reactor, is explained in reference to FIG. 1. First of all, an outline of the boiling water type nuclear reactor plant to which the present invention is applied is explained. The steam generated at core 2 in a nuclear reactor pressure vessel 1 is supplied to a turbine 5 through a main steam pipe 3. This steam, drives the turbine 5 and then is condensed into water at a condenser 6. This water is returned as feed water to the nuclear reactor pressure vessel through a feed water pipe 10. This feed water is pressurized by feed water pumps 11A and 11B (or a feed water pump 15). The feed water pumps 11A and 11B are turbine driven types and each has a supply capacity corresponding to a cooling water flow of 55% (feed water flow). A bleeder tube 12A introduces the steam bled from the turbine 5 to the turbine of the feed water pump 11A. A steam governor valve 13A and a steam stop valve 14A are provided in the bleeder tube 12A. A bleeder tube 12B introduces the steam bled from the turbine 5 to the turbine of the feed water pump 11B. A steam governor valve 13B and a steam stop valve 14B are provided in the bleeder tube 12B. The feed water pump 15 is a motor driven type and has a supply capacity corresponding to a feed water flow of 27.5%. A feed water governor valve 16 is provided in the feed water pipe 10 down stream of the feed water pump 15.

A generator 9 is disengageably connected to the turbine 5. A steam governor valve 4 is provided in the main steam tube 3. A bypass pipe 7 with a bypass valve 8 is directly connected between the main steam tube 3 and the condenser 6. Through the drive of a reactor internal pump (RIP) 17, cooling water is supplied to the core 2. The cooling water flow supplied to the core, that is core flow, is controlled by adjusting the speed of RIP 17. The nuclear reactor power of the boiling water type nuclear reactor is controlled by the control of the core flow, as well by the control rods 18. The control rods are connected to a control rod driving device 19. Both hydraulic driven and motor driven type may be used for the control rod driving device 19.

A water level gauge 20 is provided at the nuclear reactor pressure vessel 1. The water level gauge 20 detects the water level H in the nuclear reactor pressure vessel 1. A flow meter 21 that detects the steam flow Qs discharged from the nuclear reactor pressure vessel 1 is provided in the main steam tube 3. A flow meter 22 that detects the feed water flow Qw supplied to the nuclear reactor pressure vessel 1 is provided at the feed water pipe 10. A feed water controller 23 receives as input the detected water level H, steam flow Qs and feed water flow Qw, and controls the feed water flow based upon these inputs, through the well known three element control. The feed water controller 23 outputs a control signal for controlling opening degrees of the steam governor valves 13A and 13B and the feed water governor valve 16. In a normal operation of the nuclear reactor (for example, in the power operation of 100%) the feed water pumps 11A and 11B are driven and the feed water pump 15 is standing by as a back-up.

A trip detection device 24 receives inputs of measured values, such as speed of the feed water pumps 11A, 11B, discharge pressure of the feed water pumps 11A, 11B, bled steam flow supplied to the pump driving turbines, current flowing to the motor of the feed water pump 15 and conditions relating to the feed water pump, such as the voltage applied thereto, and thereby detects the trip of the feed water pumps 11A, 11B. When the trip detection device 24 detects the trip of a certain feed water pump, the device outputs a trip signal St to the steam stop valve (14A or 14B) of the corresponding feed water pump and a circuit breaker 25. The steam stop valve is full-closed by the trip signal St. The circuit breaker 25 is opened by the trip signal St.

The present embodiment further includes four detectors as indicate below. A generator output detector 26 detects an electric power W that is the output of the generator. A neutron detector 27, which detects nuclear reactor power $P_R$, is provided in the core 2. A flow meter 28 provided in the nuclear reactor measures core flow Qr. A position detector 29 measures the insertion depth (position of the control rod in axial direction) of the control rod 18 into the core.

Figure 2:
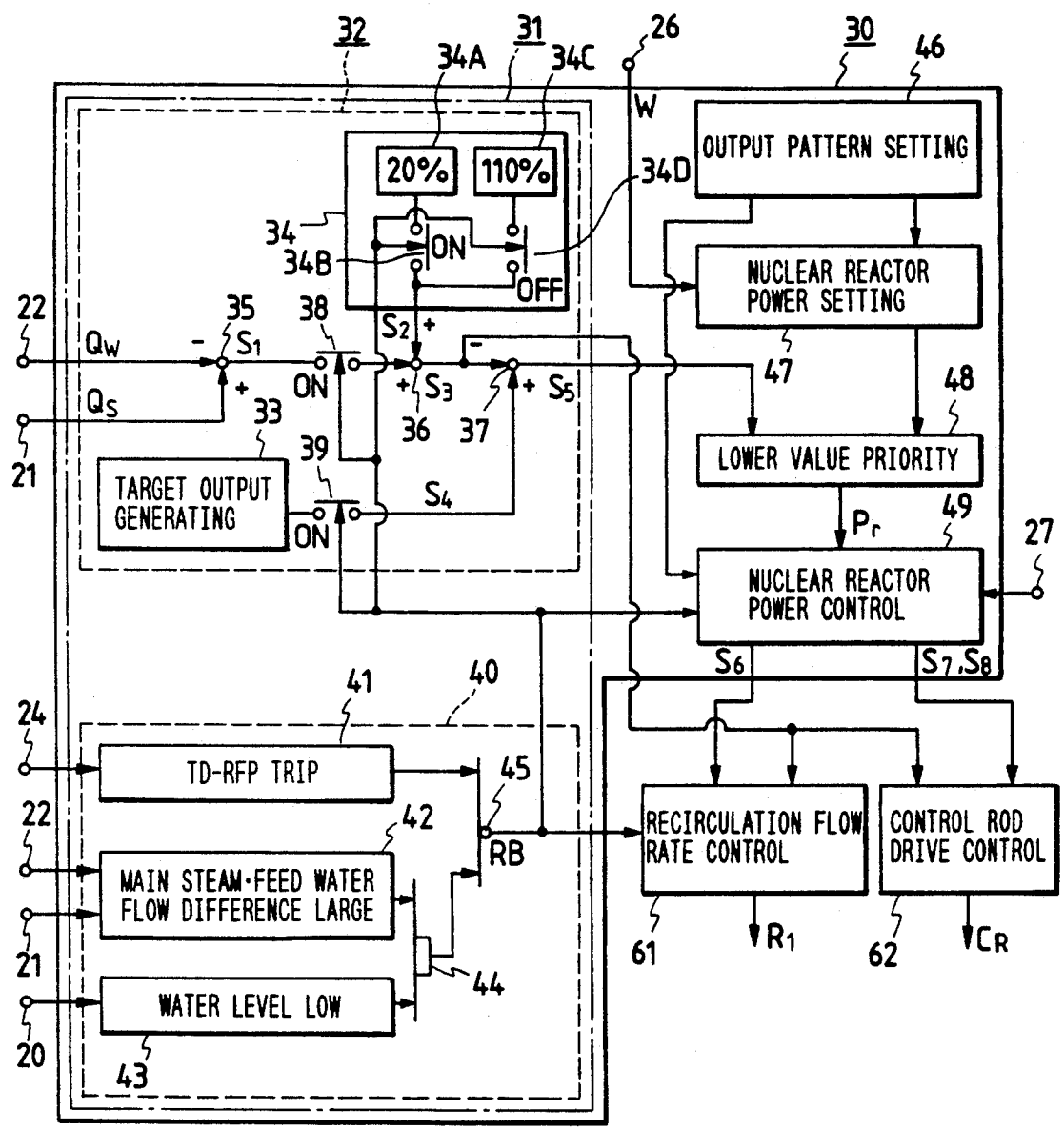
FIG. 2 is a detailed diagram of the output control device in FIG. 1.

An output control device 30 controls the nuclear reactor power $P_R$ both in normal and abnormal conditions. The output control device 30 includes abnormal feed water control system 31, output pattern setting device 46, nuclear reactor power setting device 47, a low value priority circuit 48 and nuclear reactor power setting device 49, as shown in FIG. 2. The abnormal feed water control system 31 has allowable nuclear reactor power setting device 32 and operating mode switch 40.

The allowable nuclear reactor power setting device 32 includes target power generating device 33, run-out, that is overspeed, preventing device 34 and adders 35, 36, 37 and switches 38, 39. The overspeed preventing device 34 has a signal generator 34A connected to the adder 36 through the switch 34B and a signal generator 34C connected to the adder 36 through the switch 34D. The signal generator 34A outputs signal $S_2$ that corresponds to 20%. The signal generator 34C outputs signal $S_2$ that corresponds to 110%. The adder 35 is connected to the flow meters 21 and 22 and outputs the difference $S_1 = Qs - Qw$, the output signals of the respective flow meters. The switches 34B, 38, 39 are closed (ON) when the operation mode switch 40 outputs a speed reduction signal RB. The switch 34D is opened (OFF) when the speed reduction signal RB is output. The adder 36 is connected to the adder 35 through the switch 38. The adder 36 outputs a signal $S_3$ obtained by adding the difference $S_1$ to the signal $S_2$. The adder 37 is connected to the target power generating device 33 through the switch 39 and also to the adder 36. The adder 37 outputs difference $S_5 = S_4 - S_3$. The signal $S_4$ is a target output that is output from the target power generating device 33 and is the allowable nuclear reactor power at the moment of trip of the feed water pump 11A (or 11B). In the example of the present embodiment, the signal $S_4$ is a signal corresponding to the nuclear reactor power of 75%.

The operation mode switch 40 includes TD-RFP (turbine driver type reactor feed water pump) trip confirming device 41, flow difference determining device 42, water level determining device 43, an AND circuit 44 and an OR circuit 45. The TD-RFP trip confirming device 41 outputs a signal of logic "1" when the trip signal St is output. The flow difference determining device 42 outputs a signal of logic "1" when the difference $S_1 = Qs - Qw$ becomes larger than a fixed value. The water level determining device 43 outputs a signal of logic "1" when the water level "H" goes down to a fixed value. The fixed value of the water level "H" is a level set at a comparatively higher level than the low nuclear reactor water level that causes the nuclear reactor scram, and further is set at a lower level than the normal water level. The outputs of the flow difference determining device 42 and the water level determining device 43 are input to the AND circuit 44. The outputs of the TD-RFP trip confirmation device 41 and the AND circuit 44 are input to the OR circuit 45. The OR circuit 45 outputs a speed reduction signal RB when either the TD-RFP trip confirmation device 41 or the AND circuit 44 outputs a signal of logic "1".

The output pattern setting device 46 is connected to a general supervisory computer not shown. The output pattern setting device 46 prepares an output pattern of the generator based upon data output from the general supervisory computer. The nuclear reactor power setting device 47 is connected to the output pattern setting device 46. The nuclear reactor power setting device 47 determines a fixed nuclear reactor power corresponding to the output pattern of the generator prepared by the output pattern setting device 46 and the measured electric power W. The input side of the low value priority circuit 48 is connected to the adder 37 of the allowable nuclear reactor power setting device 32 and the nuclear reactor power setting device 47, and the output side thereof is connected to the nuclear reactor power control device 49. The low value priority circuit 48 selects a lower output among those of the adder 37 and the nuclear reactor power setting device 47 and outputs the same as a signal Pr.

Figure 3:
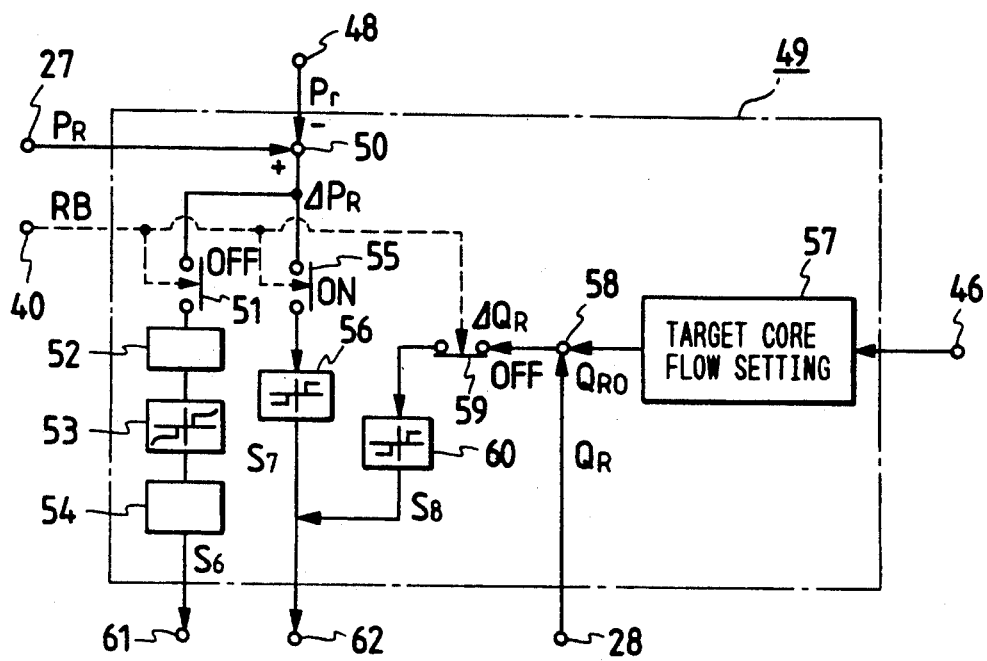
FIG. 3 is a detailed diagram of the output control in FIG. 2.

The nuclear reactor power control device 49 is shown in FIG. 3 and has output $S_6$. The nuclear reactor power control device 49 is provided with adders 50, 58, switches 51, 55, 59, a limiter 52, hysteresis switches 53, 56, 60, a PI controller 54, and a target core flow setting device 57. Each of these hysteresis switches has a dead zone. The adder 50 is connected to the neutron detector 27 and the low value priority circuit 48. The adder 50 outputs the difference $\Delta P_R = P_R - P_r$. The switches 51 and 59 are opened (OFF) based on the power (or speed) reduction signal RB, and the switch 55 is closed (ON) based on the power reduction signal RB. The limiter 52 is connected to the adder 50 through the switch 51, and connected to the hysteresis switch 53 and the PI controller 54. The target core flow setting device 57 determines a corresponding fixed core flow $Q_{RO}$ based on the output pattern of the generator prepared by the output pattern setting device 46. The adder 58 is connected to the flow meter 28 and the target core flow setting device 57 and determines the difference $\Delta Q_R = Q_{RO} - Q_R$. The hysteresis switch 60 is connected to the adder through the switch 59. The PI controller 54 is connected to a recirculation flow control device 61. The recirculation flow control device 61 is also called a core flow control device. The hysteresis switches 56 and 60 have outputs $S_7$ and $S_8$ connected to a control rod driving control device 62.

Figure 4:
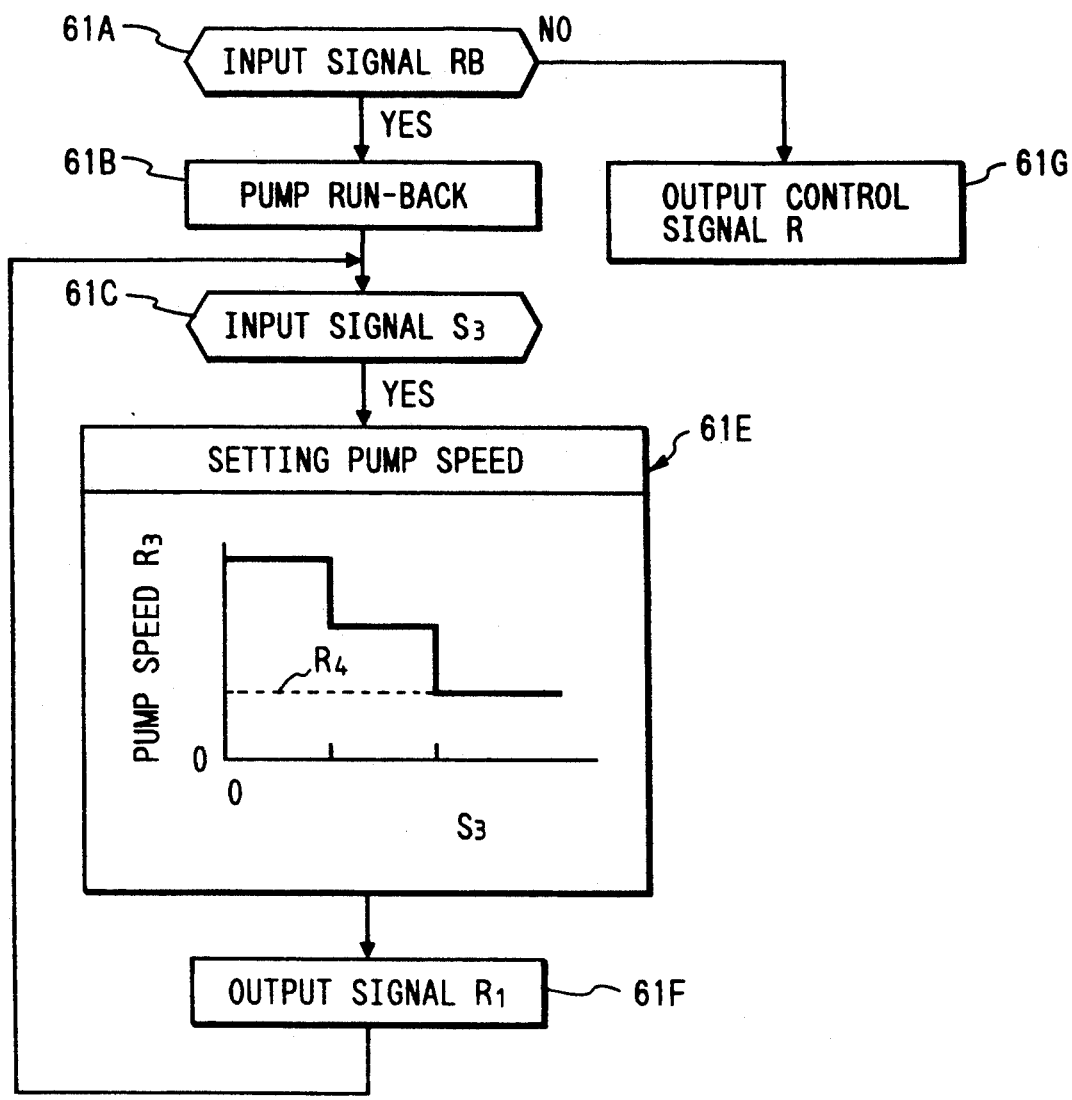
FIG. 4 is a view for explaining the processing sequence performed in the recirculation flow control device in FIG. 1.

The recirculation flow control device 61 receives as inputs the output signals $S_6$, $S_3$, RB of the output control device 30, carries out the processing sequence shown in FIG. 4, and controls the core flow $\Delta Q_R$. The recirculation flow control device 61 outputs a control signal $R_1$ to the driving motor for the RIP 17.

Figure 5:
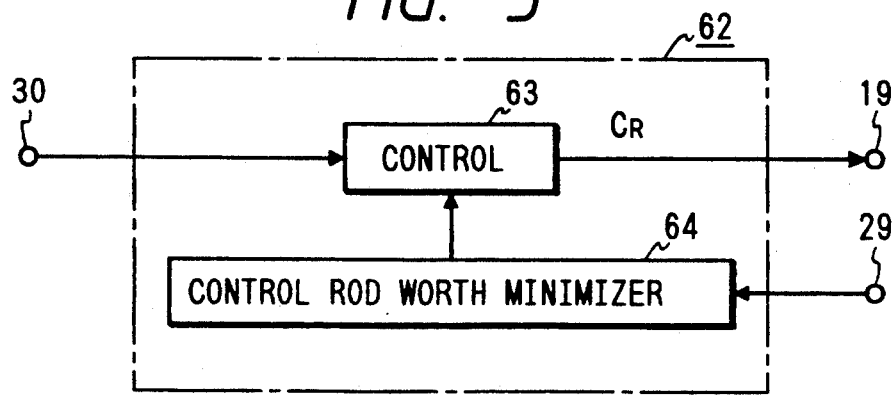
FIG. 5 is a detailed diagram of the control rod.
Figure 6:
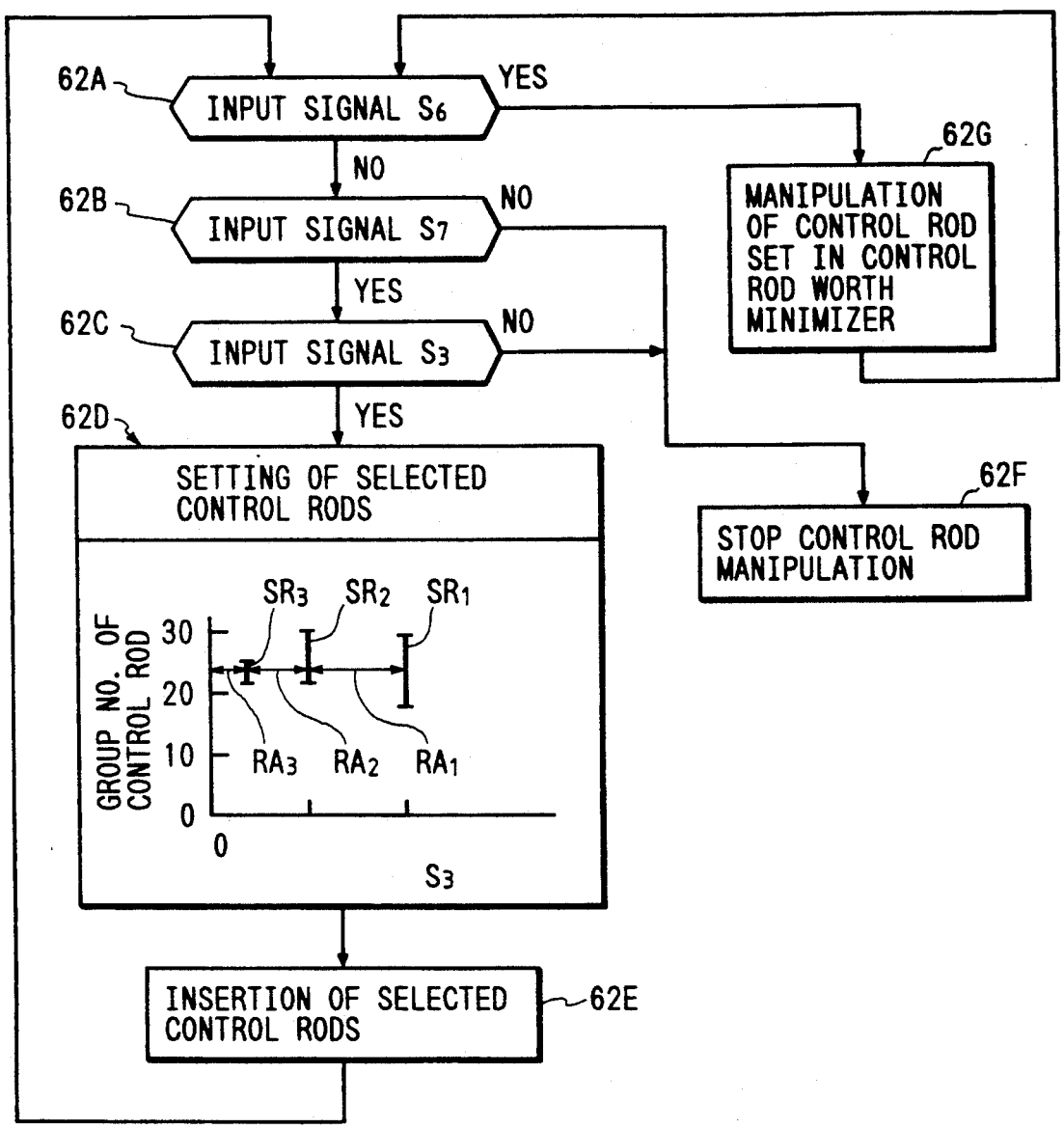
FIG. 6 is a view for explaining the processing sequence performed in the control in FIG. 5.

The control rod drive control device 62 shown in FIGS. 2 and 5, outputs a control signal $C_R$ to the control rod driving device 19. The control rod driving control device 62 has a control device 63 and a control rod worth minimizer 64. The control device 63 inputs the output signals from the output control device 30 and the control rod worth minimizer 64, and then it carries out the processing sequence shown in FIG. 6. In the control rod worth minimizer 64, a control rod insertion and withdrawal sequence is set that defines the manipulation order of the control rods in normal operation. The signal from the position detector 29 is transmitted to the control rod worth minimizer 64. An example of the control rod insertion and withdrawal sequence is illustrated in FIG. 7.

Figures 7, 8:
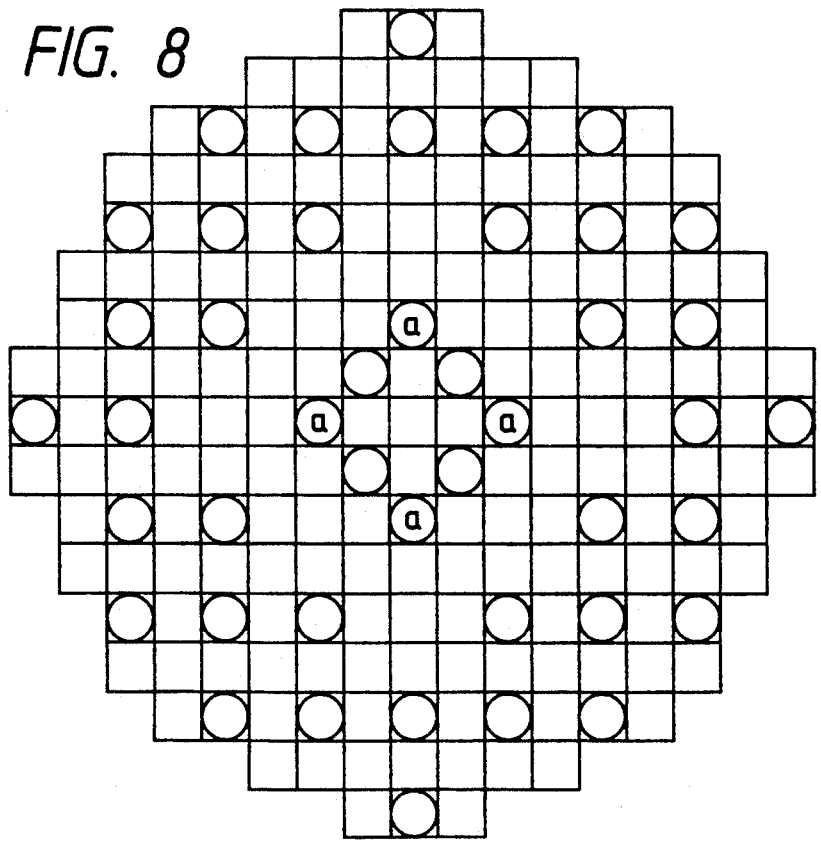
FIG. 7 is a view for explaining an example sequence of the control rod insertion and withdrawal set in the control rod worth minimizer in FIG. 5.
FIG. 8, FIG. 9 and FIG. 10 are views for explaining the location of the selected control rods.

In FIG. 7, the column $F_1$ shows the group number of the control rod. The column $F_2$ shows the relative value of lapsed time and the column $F_3$ shows the position of the control rod in the axial direction. One group includes a plurality (usually 4) of control rods 18. The column $F_3$ indicates the notch number determined by equally dividing the core in its axial direction into forty-eight parts, for indicating the position of the control rod. The notch number of "48" corresponds to the full withdrawal of the control rods 18. Further the notch number of "0" corresponds to the full insertion of the control rods. The control rods included in the group 27 are withdrawn to the position of notch "6" at the lapsed time of 12 and to the position of notch "12" at the lapsed time 13. At the lapsed time 12 the control rods 18 in groups 22 and 23 are withdrawn to the position of notch "12" and the control rods 18 in groups 26 to 30 are withdrawn to the position of notch "6".

The operation of the nuclear reactor power control device according to the present embodiment is explained below.

First of all, the case where the two feed water pumps 11A and 11B are in a normal operating condition is explained, with reference to FIG. 2. Since the trip detection device 24 detects no trips of the feed water pumps 11A and 11B, no trip signal St is output. Therefore the OR circuit 45 outputs no power reduction signal RB, and the switches 34B, 38, 39 of the allowable nuclear reactor power setting device 32 are opened (OFF). Further, the switch 34D is closed (ON). The switches 51 and 59 of the nuclear reactor power control device 49 in FIG. 3 are closed (ON) and the switch 55 thereof is opened (OFF). Among the signals output from the signal generator 34C and the fixed value of the nuclear reactor power output from the nuclear reactor power setting device 47, the low value priority circuit 48 selects the later fixed value as a signal Pr. The signal Pr is output to the nuclear reactor power control device 49. The output $\Delta P_R$ from the adder 50 of FIG. 3 is input to the limiter 52 through switch 51. The output of the limiter 52 is transmitted to the hysteresis switch 53. The PI controller 54 inputs the output of the hysteresis switch 53 and outputs a signal $S_6$. The hysteresis switch 60 inputs the difference $\Delta Q_R$ from adder 58 through switch 59 and outputs a corresponding signal $S_8$. The signal $S_6$ is transmitted to the recirculation flow control device 61. Further the signal $S_8$ is input to the control rod driving control device 62. Since no power reduction signal is input to the recirculation flow control device 61, step 61A of FIG. 4 becomes "NO". Therefore, the process of the next step 61G is performed, and the recirculation flow control device 61 outputs a control signal $R_1$. The control signal $R_1$ is a signal for generating a pump speed corresponding to the signal $S_6$. The speed of the RIP 17 is controlled based on the control signal $R_1$. Accordingly, the core flow is controlled by the recirculation flow control device 61 to obtain a nuclear reactor power determined at the nuclear reactor power setting device 47.

The control of the nuclear reactor power by the manipulation of the control rods is carried out by inputting the signal $S_8$ to the control rod driving control device 62. Namely, the determination in step 62A of FIG. 6 becomes "YES", and the processing of the step 62G is executed. The step 62G outputs the control signal $C_R$ to the control rod driving device 19 for manipulating the corresponding control rod in order to manipulate control rods in a fixed group defined in the control rod worth minimizer 64. The fixed value $Q_{RO}$ of the core flow is determined based on the output pattern of the generator prepared at the output pattern setting device 46. Further the control signal $C_R$ is generated based on the difference $\Delta Q_R$. Accordingly, the control of the nuclear reactor power by the control rods functions to obtain a fixed nuclear reactor power together with the control of the nuclear reactor power by the adjustment of core recirculation flow, which supplement each other.

For the start and stop of the nuclear reactor and the nuclear reactor power control such as in the power operation (nuclear reactor power of 100%), a load following operation and an AFC operation are carried out through the above explained core flow control and control rod control.

Assuming that the boiling water type nuclear reactor reaches an operating condition (point A in FIG. 14) of a nuclear reactor power of 100% and a core flow of 85% through the above explained nuclear reactor power control. The core flow of 85% is the minimum core flow at the nuclear reactor power of 100%, in the expanded operation range.

The operation of the present embodiment is explained when an abnormality happens under these conditions, wherein the feed water pump 11A trips and the feed water pump 15 that stands by does not start. One feed water pump 11B is now running. In this first case, the trip signal St output from the trip detector 24 because of the trip of the feed water pump 11A fully closes the steam stop valve 14A. The TD-RFP trip confirming device 41 of the operation mode switch 40 receiving this trip signal, outputs a signal of logic "1". The OR circuit 45 outputs a power reduction signal RB in response to this signal. Therefore, the switches 34B, 38, 49, 55 are closed and the switches 34D, 51, 59 are opened. The operation mode switch 40 works also as a power reduction signal generating device.

Figure 14:
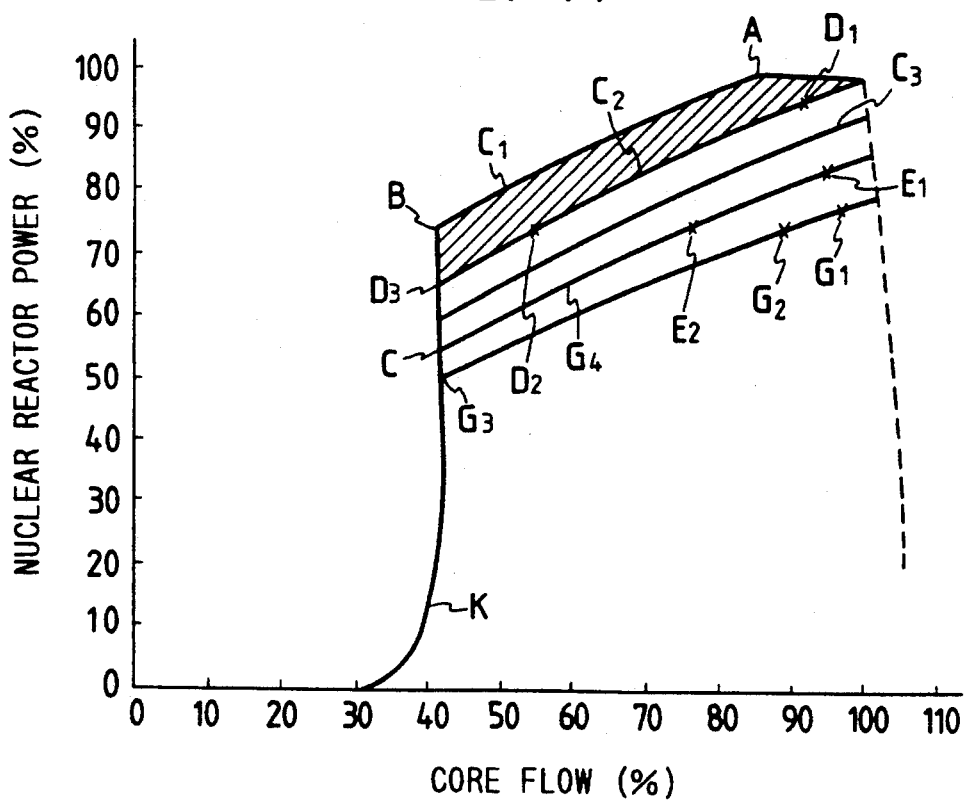
FIG. 14 is a characteristic curve diagram illustrating a relationship between the core flow and the nuclear reactor power in an expanded operating region.

The power reduction signal RB is input to the recirculation flow control device 61. Therefore, the step 61A of FIG. 4 determines "YES". Next the step 61B is executed. The step 61B runs back, that is rapidly reduces the speed of the RIP 17, that is, performs pump run-back. Namely, the speed $R_2$ of the RIP 17 is obtained, which determines the corresponding core flow $Q_{R1}$ to the nuclear reactor power of 75% and the control signal $R_1$ corresponding to the speed $R_2$ is output. Through the control signal $R_1$, the RIP 17 is reduced in speed to the speed $R_2$. Further, the core flow $Q_{R1}$, when the nuclear reactor power decreases to 75% through the speed reduction of the RIP 17, varies depending upon the nuclear reactor operating conditions (in particular, nuclear reactor power and the core flow) at the moment of the speed reduction of the RIP 17. Thereforem it is necessary to obtain a core flow corresponding to the nuclear reactor operating condition when the RIP 17 is reduced in speed by using many core flow-nuclear reactor power characteristic curves (for example, the characteristic curves $C_1$, $C_2$, $C_3$, $C_4$ of FIG. 14) illustrating the decreasing process of the nuclear reactor power due to the speed reduction of the RIP 17. The recirculation flow control device 61 of the present embodiment stores these core flow-nuclear reactor power characteristic curves and determines the core flow $Q_{R1}$ by using these characteristic curves. In the present case, since the normal operating condition of a nuclear power of 100% and a core flow of 85% is assumed, the core flow $Q_{R1}$ is obtained by using the characteristic curve $C_1$. The core flow corresponding to point B of FIG. 14 on the minimum speed curve K of FIG. 14 is used to produce the signal to control the RIP 17.

Since only the feed water pump 11B is operating, the feed water flow Qw is less than the steam flow so that there is a mismatch between the steam flow Qs and the feed water flow Qw. Therefore the adder 35 of the allowable nuclear reactor power setting device 32 outputs the difference $S_1$ used to make the mismatch amount zero. The adder 36 outputs the signal $S_3$ that is obtained by adding the signal $S_2$, which corresponds to 20% of the output from the signal generator 34A, to the signal $S_1$. The adder 37 outputs the difference $S_5$. The signal $S_3$ is transmitted to the recirculation flow control device 61 and the control rod drive control device 62. The signal $S_5$ is transmitted to the lower value selection or priority circuit 48.

The reasons why the signal $S_2$ that corresponds to 20% of the output of the signal generator 34A is added in the adder 36 for obtaining the signal $S_3$ are as follows. The rated capacity of the turbine driven type feed water pump is 55%, but the operation at 68% for a short period is possible. However, when the feed water pump 11B is operated for a long time (for example, over one minute) under the feed water capacity of 68%, the feed water pump 11B itself is tripped for preventing over speed. Under this condition, the nuclear reactor scram is reached. The overspeed preventing device 34 has a function of reducing the nuclear reactor power to a level to prevent overspeed of the turbine driven type feed water pump. When such an overspeed preventing device is not provided, the feed water pump 11B possibly runs too fast and trips even if the nuclear reactor power runs back, that is rapidly reduces the to the state where the abovementioned difference becomes zero. The signal $S_2$ output from the overspeed preventing device 34 has a value to ensure reducing the nuclear reactor power to a level that should prevent overspeed of the turbine driven type feed water pump.

The reasons why the signal $S_4$ corresponding to 75% of the nuclear reactor power is defined for the target output generating device 33 are as follows. In a case that one turbine driven type feed water pump and one motor driven type feed water pump are in an operating condition, an obtainable nuclear reactor power is 75%. The nuclear reactor power of 75% also corresponds to the nuclear reactor power at point B; from the operating condition of a nuclear reactor power of 100% and the core flow of 85% all of the RIPs 17 are speed reduced so that the core flow is reduced to a value on the minimum revolution speed curve K of FIG. 4 for the RIP 17. The target output generating device 33 changes a fixed value of the nuclear reactor power to 75%, which is lower than a fixed value of the nuclear reactor power setting device 47. By thus lowering the fixed value, the control of reducing the nuclear reactor power is facilitated after the speed reduction of the RIP. In the present embodiment, wherein one turbine driven type feed water pump and one motor driven type feed water pump are operated, the nuclear reactor scram is avoided by reducing the nuclear reactor power to 75%.

The recirculation flow control device 61 executes the processing of the step 61C after the step 61B, in FIG. 4. With the input of the signal $S_3$, the determination in the step 61C becomes "YES". Next the step 61D is executed, which is not shown in FIG. 4. The step 61D determines whether the speed of the RIP 17 is the fixed minimum speed (a speed for obtaining the minimum speed curve K of FIG. 14) and generates "YES". For carrying out this determination, a tachometer (not shown) for detecting the speed of the RIP 17 is provided, the output of this tachometer is input to the recirculation flow control device 61. For the determination of the step 61D as "YES", the speed of the RIP 17 is maintained at a fixed minimum revolution speed. It is not possible to reduce the speed of the RIP 17 below a fixed minimum speed. When the determination of the step 61D is "NO", the processing in steps 61E and 61F are performed, as discussed below.

The lower value priority circuit 48 selects the signal $S_5$ as the signal Pr. The difference $\Delta P_R$ is output from the adder 50 (in FIG. 3) of the nuclear reactor power control device 49, which receives the signals Pr and $P_R$, and $\Delta P_R = P_R - S_5$, the difference between the nuclear reactor power $P_R$ measured at the neutron detector 27 and the signal $S_5$. The hysteresis switch 56 outputs a signal $S_7$ based upon the difference $\Delta P_R$.

The control rod driving control device 62 receives signals $S_3$ and $S_7$. Therefore, in FIG. 6, the step 62A becomes "NO", and the next step 62B becomes "YES". The step 62C thereafter also becomes "YES" and the processing is shifted to the step 62D. When the determination in steps 62B or 62C is "NO" the manipulation of the control rods is stopped by the step 62F.

Figure 9:
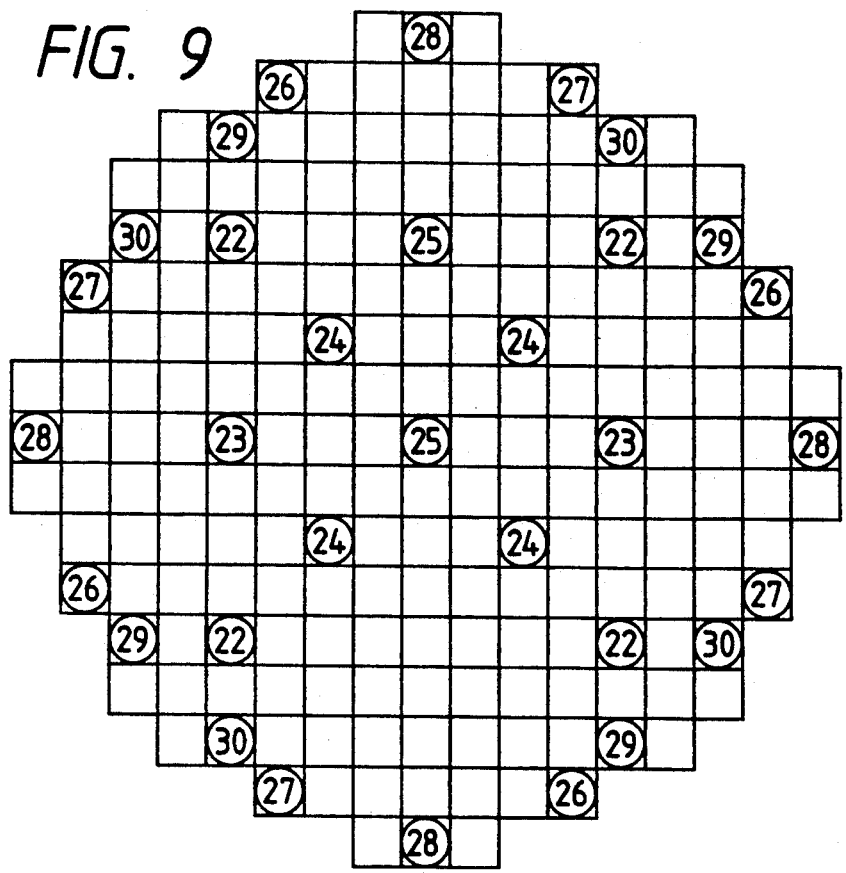
Figure 10:
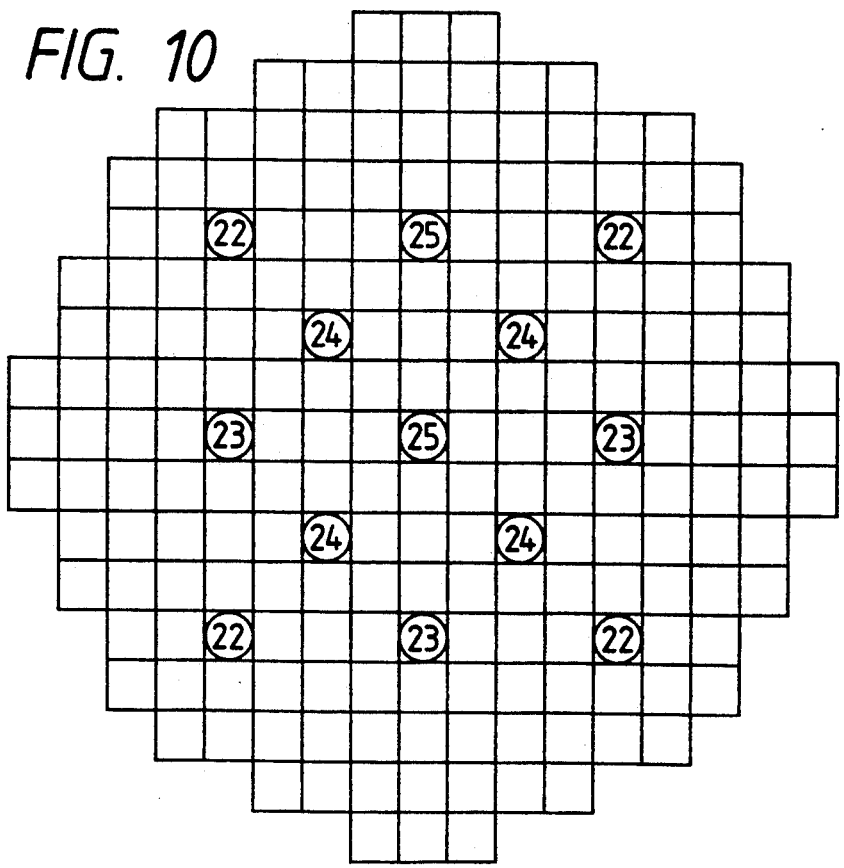

In the step 62D, the groups of control rods that are used as selected control rods are defined in response to the magnitude of the signal S3. The plurality of control rods 18 included in the defined control rod groups become the selected control rods. In the present case, the forty-four control rods 18 positioned in encircled boxes of the grid in FIG. 8 are defined as the selected control rods. FIG. 8 shows a cross sectional view of the core 2 and one box surrounded by the grid represents one cell. One cell includes four fuel rod assemblies and between these one control rod is inserted. Incidentally the selected control rods shown in FIG. 8 correspond to $SR_1$ in the characteristic curve diagram of the step 62D in FIG. 6. Further the selected control rods corresponding to $SR_2$ in the characteristic curve diagram are positioned in the encircled boxes in FIG. 9, and the control rods corresponding to $SR_3$ are positioned in the encircled boxes in FIG. 10. The numerals indicated in the circles in FIG. 9 and FIG. 10 are the group number of the control rods. Within the values of the signal $S_3$ indicated by $RA_1$ in the characteristic curve diagram of the step 62D in FIG. 6, the selected control rods of $SR_1$ are determined.

In the same manner, within the values of signal $S_3$ indicated by $RA_2$, the selected control rods of $SR_2$ are determined and within the values of signal S3 indicated by $RA_3$ the selected control rods of SR3 are determined. The selected control rods once determined never change until the nuclear reactor power decreases to the nuclear reactor power of the point C in FIG. 14 even if the signal $S_3$ changes greatly.

Step 62E outputs a control signal $C_R$ that causes insertion into the core of a plurality of the control rods included in the control rod groups determined as above as the selected control rods. The control signal $C_R$ is transmitted to the control rod driving device 19 that manipulates the respective control rods determined as the selected control rods. The control rod driving device 19, receiving the control signal $C_R$, inserts the corresponding control rods into the core 2. Through the runback (that is, speed reduction) of the RIP 17 and the insertion of the selected control rods, the nuclear reactor power decreases from the point A to the point C of FIG. 14. The nuclear reactor power at point C (55%) is a nuclear reactor power wherein the operation of one turbine driven feed water pump avoids the nuclear reactor scram and moreover the overspeed of the feed water pump is surely prevented. The insertion of the selected control rods of the present case functions to reduce the nuclear reactor power corresponding to the difference between point B and point C in FIG. 14. When only the avoidance of the nuclear reactor scram is required, it is enough to decrease the nuclear reactor power to about 65%. However, in such a case, the overspeed of the feed water pump 11B under operation possibly happens.

Figure 11A:
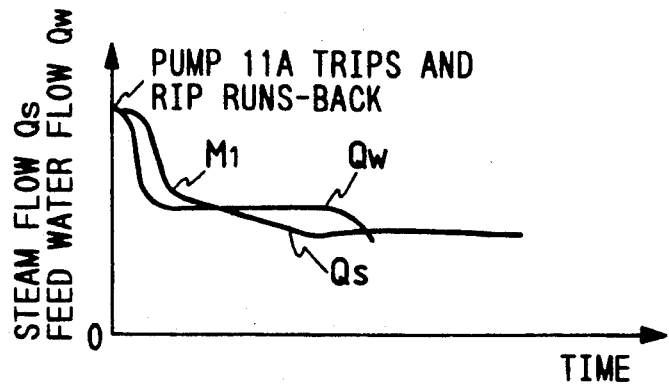
FIGS. 11a and b are views for explaining the characteristic curves obtained with the embodiment in FIG. 1, when the feed water pump trip happened at point A of FIG. 14.
Figure 11B:
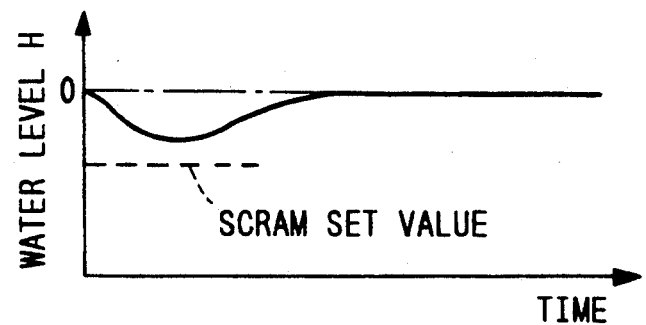
Figure 15A:
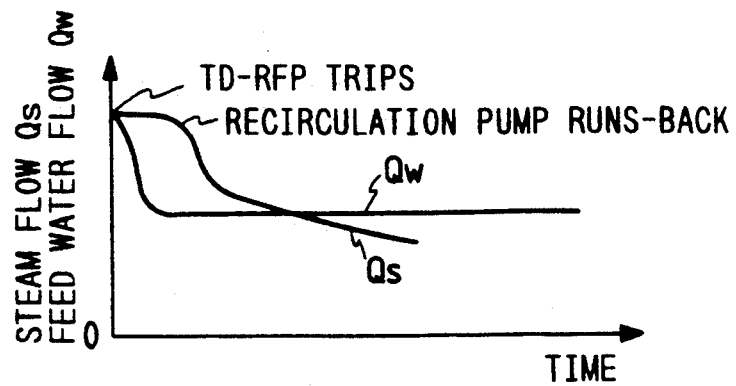
FIGS. 15a and b are views for explaining characteristic curves obtained with a conventional device when the feed water pump trip happened at the point A in FIG. 14.
Figure 15B:
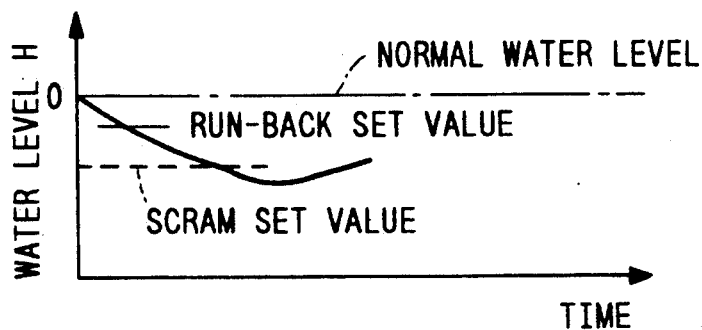

The changes of the steam flow Qs, the feed water flow Qw and the water level H are shown in FIG. 11, when the above described abnormality of the feed water pump happened under the operating condition of point A in FIG. 14. The feed water flow Qw suddenly decreases due to the trip of the feed water pump 11A. Further the steam flow Qs also suddenly decreases because of the decrease of the nuclear reactor power due to the speed reduction of the RIP that occurs substantially simultaneously with the trip of the feed water pump 11A. The initiation of decrease of the steam flow Qs, which is much earlier than the case in FIG. 15, begins substantially simultaneously with the initiation of decrease of the feed water flow; this is because the generation of the power reduction signal RB occurs substantially simultaneously with the generation of the trip signal St from the trip detection device 24. The point $M_1$ matches the point B of FIG. 14. By the operation of the control rod driving control device 62 based upon the mismatched amount difference $S_1$ between the steam flow Qs and the feed water flow Qw output from the adder 35, the nuclear reactor power is decreased through the insertion of the selected control rods into the core so that the steam flow below the point $M_1$ gradually decreases. Soon the steam flow Qs becomes less than the feed water flow Qw. This mismatch is canceled through the operation of the feed water controller 23, and the feed water flow Qw and the steam flow Qs become the same. On the other hand, the water level H once decreased due to the trip of the feed water pump 11A, rises in response to the power reduction of the nuclear reactor power with the insertion of the selected control rods. The water level H does not reduce to the fixed level of the nuclear reactor scram and the nuclear reactor scram is avoided. Namely the conventional problems shown in FIG. 15 are eliminated. In the present embodiment, the insertion initiation time of the selected control rods into the core has been hastened, as compared to the prior art. This is because the preparation of the control signal $C_R$ utilizing the difference $S_1$ in the control rod driving control device 62 is allowed by the use of the power reduction signal RB.

The second case is explained wherein the operating condition of the nuclear reactor is at the point $D_1$ on the characteristic curve $C_2$ of FIG. 14. Like the first case, it is assumed that an abnormality happened, for example an abnormality of the feed water system, including the feed water pump and the feed water lines, e.g., breakage of a pressurized feed water line. The operation of the output control device 30 at this moment is the same as that described above. The recirculation flow control device 61 executes processing in steps 61A, 61B, 61C, 61D of FIG. 4 in their order. The nuclear reactor power decreases to 75% along the characteristic curve $C_2$ through the speed reduction operation by the step 61B. Such nuclear reactor power reduction is achieved by speed reduction of the RIP 17 to a point $D_2$ on the characteristic curve $C_2$ where the core flow becomes $Q_{R1}$. Since the step 61D becomes "No", the processing is shifted to the step 61E. The step 61E determines the speed $R_3$ of the RIP 17 to further reduce the nuclear reactor power to point $D_2$. The speed $R_3$ is determined based upon the magnitude of the signal $S_3$. In the characteristic curve diagram in step 61E, $K_1$ shows a fixed minimum speed of the RIP 17 The step 61F outputs a control signal $R_1$ based upon the speed $R_3$. The speed of the RIP 17 reduces to $R_3$ and the nuclear reactor power reaches a value at the point $D_3$ in FIG. 14. The power reduction of the nuclear reactor power corresponding to the difference between point $D_3$ and point C is carried out by executing the steps 62A to 62E in FIG. 6 of the control rod driving control device 62. Further, when the initial operating condition (the operating condition when an abnormality occurs, e.g., the feed water pump 11A trips and the feed water pump 15 never starts) is on the characteristic curve $C_2$, the selected control rods determined by the step 62D are for $SR_2$. Incidentally, when an initial operating condition is on the characteristic curve $C_3$, the selected control rods determined by the step 62D are $SR_3$.

The third case is explained wherein the initial operating condition is at point $E_1$ on the characteristic curve $C_4$ of FIG. 14. The operation of the output control device 30 is the same as that described above. In the present case, only by the execution of steps 61A to 61F of FIG. 4 by the recirculation flow control device 61, the nuclear reactor power decreases to the point C. Namely no insertion of the selected control rods is performed. Further, with the step 61B, the RIP 17 is reduced in speed so that the core flow $Q_R$ on the characteristic curve $C_4$ reaches point $E_2$.

In the cases explained above, the insertion of the selected control rods is continued until the signal $S_3$ reaches zero and at the moment thereof the insertion is stopped. There is a case wherein all of the selected control rods are not completely inserted into the core, but the inserting operation is stopped, so that a part thereof in the axial direction is inserted into the core. For carrying out such operation of the selected control rods, it is preferable to use a motor driven type control rod driving device 19, which makes possible a short length drive of the control rods. Accordingly the nuclear reactor power is reduced to a necessary minimum amount that avoids both the nuclear reactor scram and the overspeed of the feed water pump 11B. This leads to a shortening of time required to raise the nuclear reactor power to the rated output after the elimination of the abnormal condition. The power reduction of the nuclear reactor power to the necessary minimum amount allows for the determination of the number of the selected control rods in response to signal $S_3$, as shown in step 62D of FIG. 6, so that a fine control is effected.

Even if the decrease of the nuclear reactor power due to reduction of the core flow is effected after a fixed power reduction (output of 75%) of the nuclear reactor power based upon the speed reduction of the RIP 17, the speed of the RIP 17 is determined in response to the signal $S_3$, as shown in step 61E of FIG. 4. The reduction of the nuclear reactor power by the RIP 17 after such fixed power reduction of the nuclear reactor power is also determined to be the necessary minimum amount.

Figure 12A:
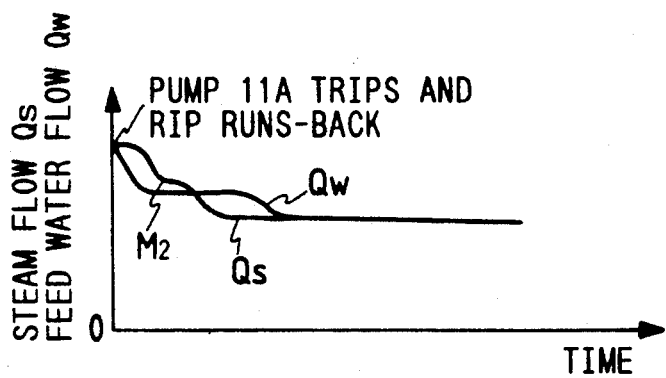
FIGS. 12a and b are views for explaining the characteristic curves obtained with the embodiment in FIG. 1 when the feed water pump trip happened at point $G_1$ in FIG. 14.
Figure 12B:
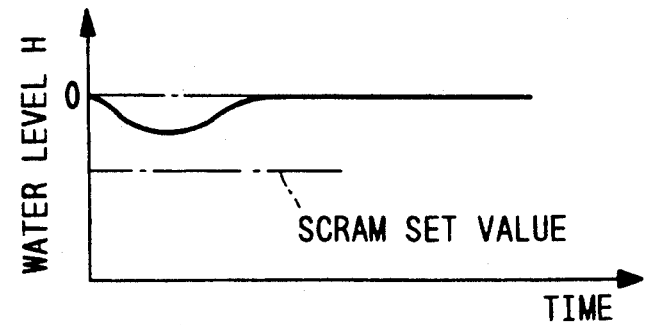

The present embodiment is also obtainable with the characteristic curve shown in FIG. 12. FIG. 12 shows a characteristic curve when the above described abnormality of the feed water pump occurs during nuclear reactor operation at point $G_1$ in FIG. 14, through the load following operation. In this case, the same output control as the third case is carried out. Like FIG. 11, the feed water flow $Q_w$ and the steam flow $Q_s$ suddenly decrease by the trip of the feed water pump 11A and the speed reduction of the RIP 17. The point $M_2$ corresponds to the point $G_2$ in FIG. 14, and to the position of nuclear reactor power of 75%. Below the point $M_2$, the nuclear reactor power decreases in response to the difference $S_1$, with the recirculation flow control device 61, and the steam flow $Q_s$ gradually decreases. The water level H decreases below the normal water level but does not decrease to the nuclear reactor scram water level, needless to say in this case also no nuclear reactor scram happens. The second reduction of the feed water flow in FIG. 12 is effected by the feed water controller 23. The features in the characteristic curve of FIG. 12 will become apparent when compared with the characteristic curve of FIG. 16.

Figure 16A:
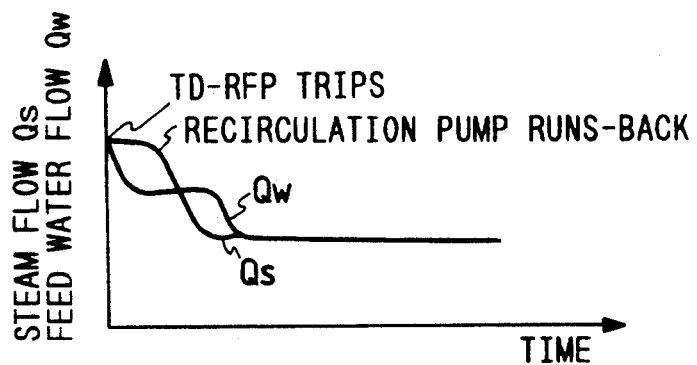
FIGS. 16a and b are views for explaining characteristic curves obtained with the conventional device when the feed water pump trip happened at the point G1 in FIG. 14.
Figure 16B:
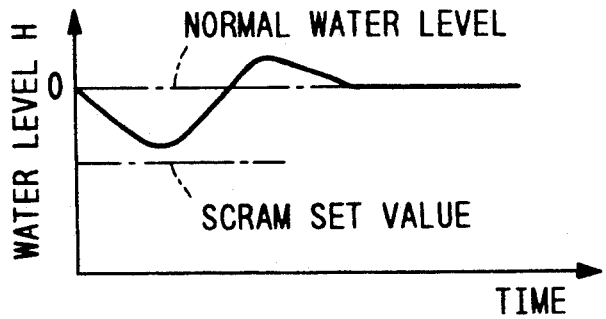

FIG. 16 shows characteristic curves when the abnormality of the feed water pump occurred in the conventional device having the characteristic curve shown in FIG. 15 and during an operating condition at the point $G_1$ of FIG. 14. In the conventional device, when one turbine driven type feed water pump is tripped, as described above, the reduction of the nuclear reactor power is effected based upon the nuclear reactor water level and the mismatched amount between the feed water flow and the steam flow. Therefore, like the characteristic curve in FIG. 15, the initiation of the decrease of the steam flow is delayed and the nuclear reactor power reduces unnecessarily to the point $G_3$ of FIG. 14. Accordingly the steam flow in the characteristic curve of FIG. 15 decreases in comparison with the characteristic curve of FIG. 12. The nuclear reactor water level as shown in FIG. 16(B) decreases in comparison with FIG. 12, and further it takes a longer time to stabilize at a normal water level state. In the present embodiment, since the reduction of the core flow by the speed reduction of the RIP 17 during the above described abnormality of the feed water pump is limited to the core flow $Q_{R1}$ that corresponds to the fixed nuclear reactor power (output of 75%), the problems shown in FIG. 16 are eliminated. In all the cases of the present embodiment, the nuclear reactor power reduced by the RIP speed reduction corresponds to the difference between the nuclear reactor power at the moment of abnormality occurrence and the nuclear reactor power of 75%. All the nuclear reactor powers at points B, $D_2$, $E_2$ and $G_2$ are that of 75%.

The operating mode switch 40 has a function of the flow difference determining device 42 and the function of the water level determining device 43. Even with the AND terms, of these functions a speed reduction signal is generated, by an abnormality other than the trip of the feed water pump, for example, the abnormality disclosed in Japanese Patent Application Laid-Open No. 49-37094 (1974), which is a broken pipe. This abnormality of the feed water flow may occur for many reasons and the RIP speed reduction occurs.

Without providing the operation mode switch 40, it may be possible to use the trip signal St as the speed reduction signal RB. In this case, for causes other than the trip of the feed water pump (for example, based upon the output from the AND circuit of FIG. 2), the power reduction signal RB for speed reduction of the RIP 17 is generated such that the construction of the nuclear reactor power control device becomes complex.

The output pattern setting device 46, the nuclear reactor power setting device 47, and the nuclear reactor power control device 49 constitute the power control device of the nuclear reactor in a normal condition. In the present embodiment, since the signal from the allowable nuclear reactor power setting device 32 included in the abnormal feed water control device 31 is transmitted to the nuclear reactor power control device 49, it may be said that a part of the power control device during normal condition is commonly used as a part of the abnormal feed water control device 31. For this reason, the structure of the nuclear reactor control device according to the present embodiment is simplified. The power reduction signal RB is also a switching signal for switching the first nuclear reactor power control function, which is included in the nuclear reactor control device of the present embodiment and used during normal condition of the feed water pump, to and from the second nuclear reactor power control function used during abnormal condition of the feed water pump. In case the power reduction signal RB is generated based upon the trip signal St, the trip signal can be the above switching signal.

Figure 13:
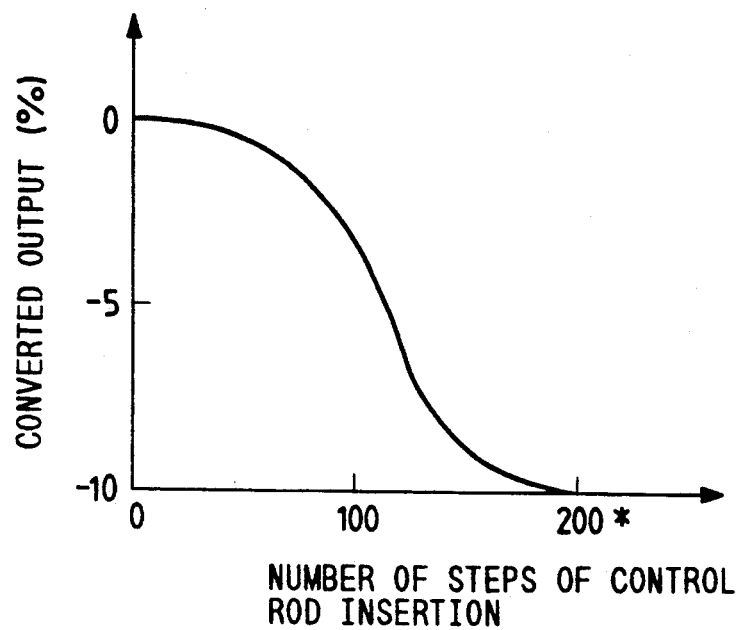
FIG. 13 is a characteristic curve diagram illustrating a negative change thrown in by the control rod insertion.

FIG. 13 shows a change of the negative reaction degree (converted output %) when the four control rods "a", as shown in FIG. 8, are moved from the full withdrawal condition to the full insertion condition into the core 2. Herein 0 on the abscissa indicates that the control rods are in a condition of full withdrawal. 200 on the abscissa device indicates that the control rods are in a condition of full insertion. The negative reaction degree changes in an S shape. Accordingly, when the control rods are in a condition near to the full withdrawal, change of the negative reaction degree is small even if the control rods are moved. For obtaining a large change of the negative reaction degree, it preferable to determine the control rods that are partially inserted into the core 2 and perform power control in a normal operating condition with the control rods that are fully withdrawn from the core. Among the selected control rods shown in FIG. 9 and FIG. 10, control rods in group numbers 22 and 24 are included that are used for the output control in a normal operation.

Among the selected control rods of FIG. 8 the control rods of group number 22 are included. The number of selected control rods can be reduced by using the control rods used in the output control during a normal nuclear reactor operation as the selected control rods. The output pattern setting device 46 shown in FIG. 2 and the nuclear reactor power setting device 47 may be provided in the general supervisory computer as explained above.

Figure 17:
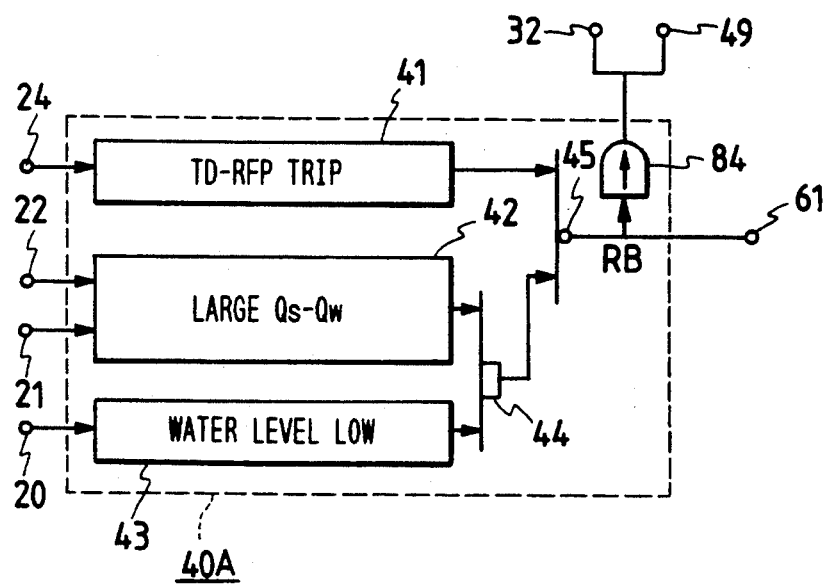
FIG. 17 is another diagram of the operation mode switching.
Figure 18:
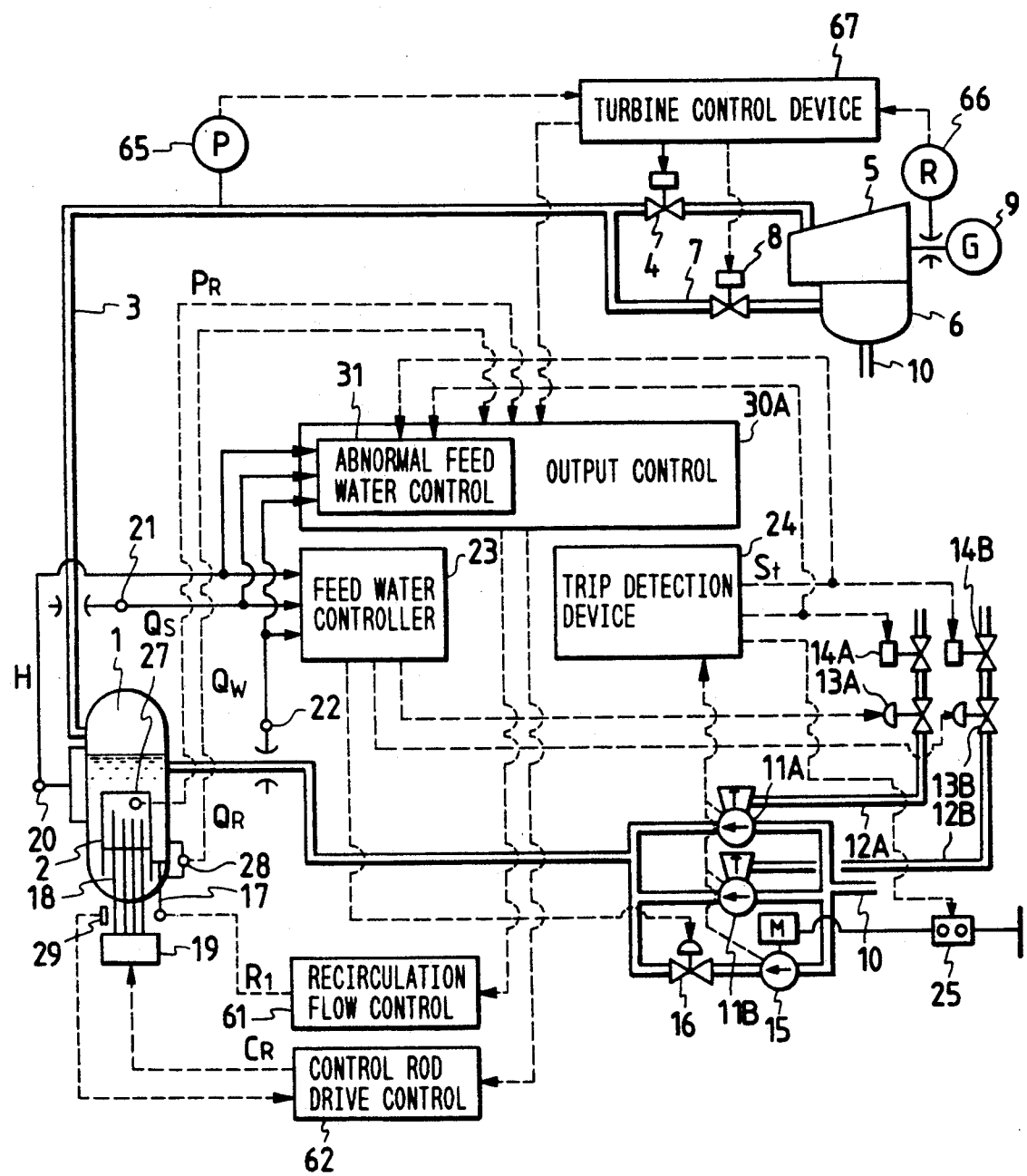
FIG. 18 is a diagram of a nuclear reactor power control device according to another embodiment of the present invention, which is applied to the boiling water type nuclear reactor.
Figure 19:
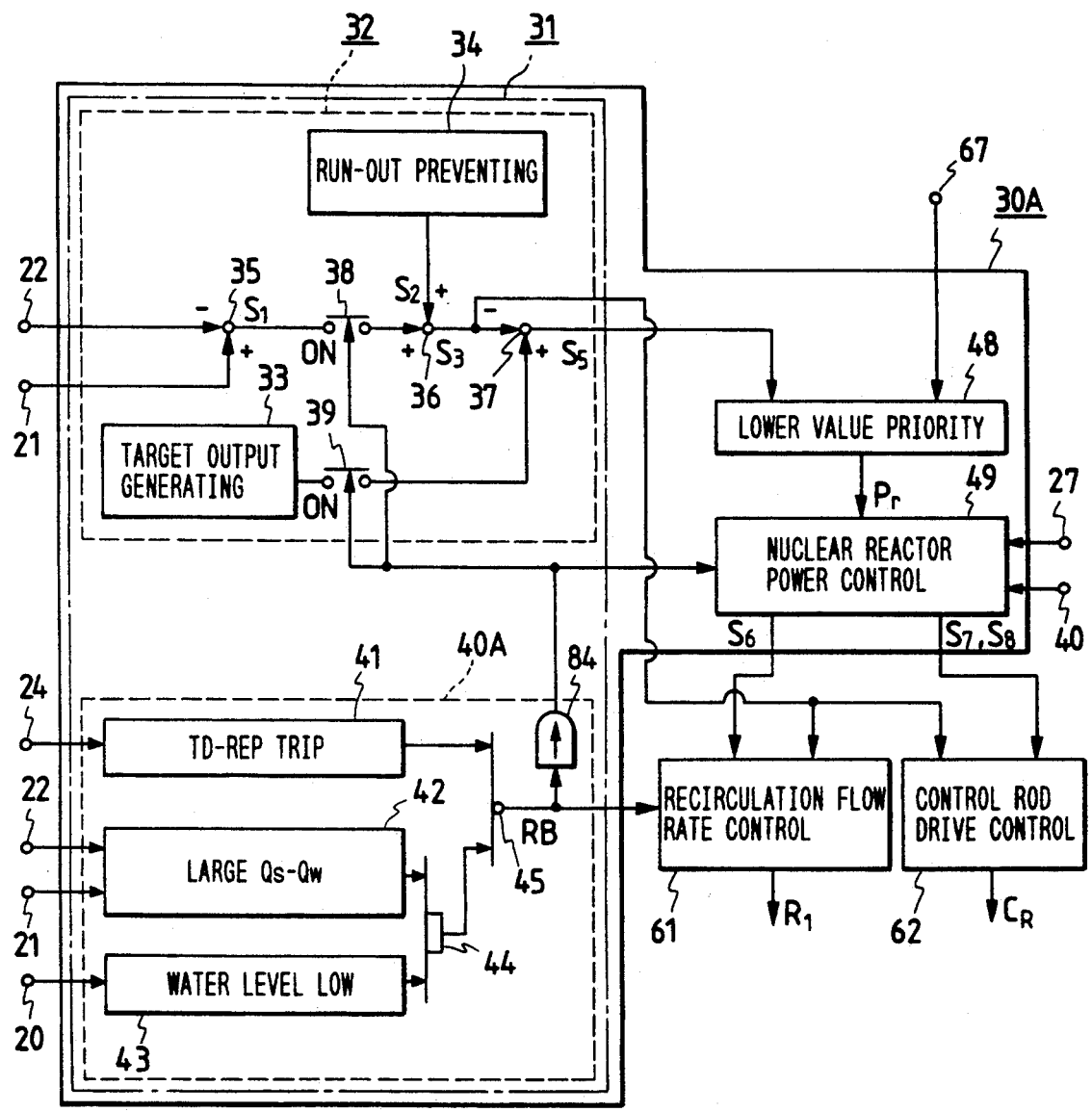
FIG. 19 is a diagram of the output control device in FIG. 18.

Another embodiment of the operation mode switch 40 of FIG. 2 is shown in FIGS. 17-19. In the operation mode switch 40A of the embodiment of FIG. 17, a delay circuit 84 is added to the constitution of the operation mode switch 40. The delay circuit 84 is connected to the output side of the OR circuit 45. In the embodiment of FIGS. 1 and 2, when the operation mode switch 40A is used in place of the operation mode switch 40, the delay circuit 84 outputs power reduction signals, which are the outputs of the OR circuit 45, to the respective switch of the allowable nuclear reactor power setting device 32 and the nuclear reactor power control device 49. The power reduction signals output from the OR circuit 45 are directly input to the recirculation flow control device 61 without passing through the delay circuit 84. The delay circuit outputs the power reduction signals that were input, but with a fixed delay (for example 2 or 3 seconds).

In the above embodiment of FIG. 1, the speed reduction of the RIP 17 and the insertion of the selected control rods are substantially simultaneously effected. However, in the embodiment of FIG. 17, after the initiation of the reduction of the nuclear reactor power by the speed reduction of the RIP 17 by recirculation flow control device 61 without delay, the insertion of the selected control rods is effected after the delay of the delay circuit 84. Namely, the insertion of the selected control rods, after the reduction of nuclear reactor power due to the speed reduction of the RIP 17, decreases the distortion of the output distribution of the core in its axial direction that is affected by the insertion of the selected control rods. This is preferable in view of the practical use of the nuclear reactor.

A nuclear reactor power control device of another embodiment according to the present invention is explained based upon FIG. 18. In the nuclear reactor power control device of FIG. 18, a turbine control device 67 is provided in place of the output pattern setting device 46 and the nuclear reactor power setting device 47 of the embodiment in FIG. 1. The output of the turbine control device 67 is input to the low value priority circuit 48 of the output control device 30A. The output control device 30A does not include the output pattern setting device 46 and the nuclear reactor power setting device 47, but includes the operation mode switch 40A.

The pressure gauge 65 that detects the steam pressure P supplied to the turbine 5 is disposed in the main steam pipe 3. A tachometer 66 detects the speed R of the turbine 5.

Figure 20:
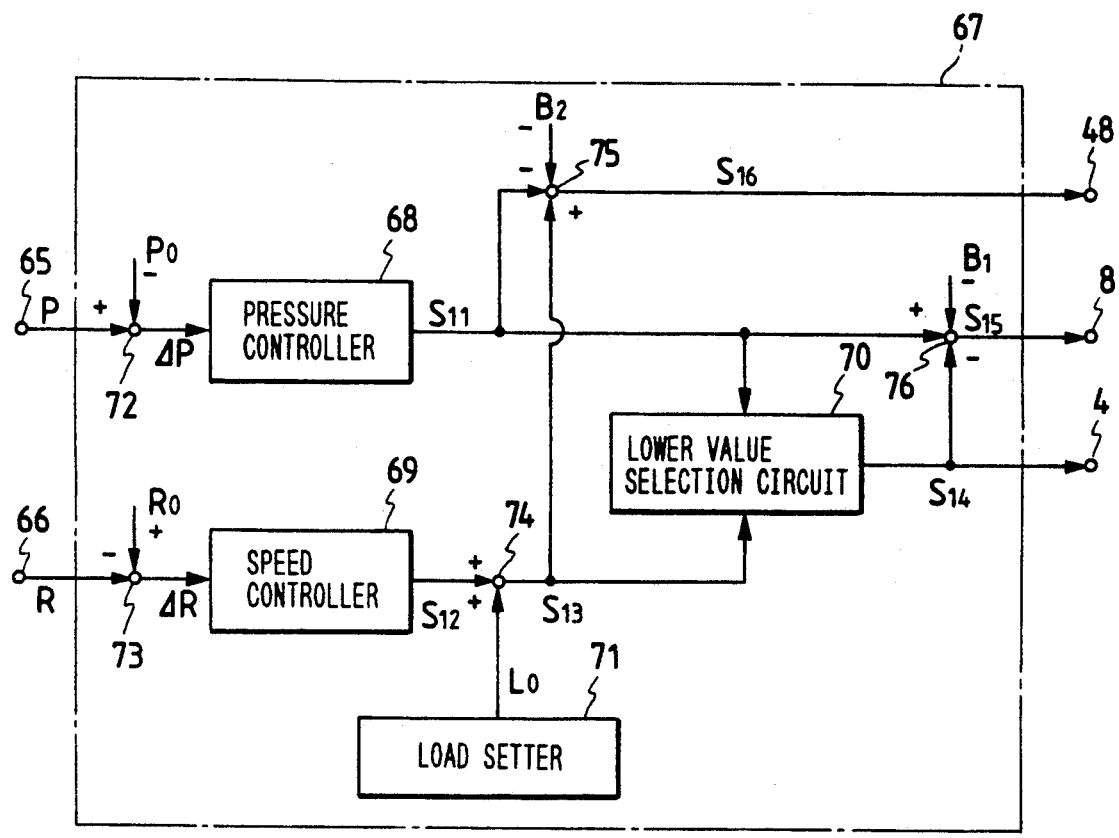
FIG. 20 is a diagram of the turbine control device in FIG. 18.

The turbine control device 67, as seen in FIG. 20, includes a pressure controller 68, a speed controller 69, a lower value selection circuit 70 and a load setter 71. The load setter 71 sets a load setting value $L_0$ based upon the instruction of the general supervisory computer. The pressure signal P output from the pressure gauge 65 is input to the adder 72. The adder 72 calculates the difference $\Delta P$ between the pressure setting value $P_0$ and the pressure signal P. The pressure controller 68 outputs a steam flow demand signal $S_{11}$ that is obtained based upon the difference $\Delta P$. The turbine speed R that is obtained at the tachometer 66 is input to an adder 73. The adder 73 determines the difference $\Delta R$ between the speed R and the speed setting value $R_0$. The speed controller 69 outputs a signal $S_{12}$ in response to the difference $\Delta R$. An adder 74 obtains the speed adjusting signal $S_{13}$ by adding the signal $S_{12}$ to the load setting value $L_0$. The lower value selection circuit 70 selects a signal having a lower value among the steam flow demand signal $S_{11}$ and the speed adjusting signal $S_{13}$ as a governor valve opening degree demand signal $S_{14}$. Since the signal $S_{12}$ is large because of its added bias, usually the steam flow demand signal $S_{11}$ is selected. The steam governor valve 4 is controlled by the steam flow demand signal $S_{11}$. An adder 76 outputs a bypass valve opening degree demand signal $S_{15}$ by adding the steam flow demand signal $S_{11}$, the governor valve opening degree demand signal $S_{14}$ and a bias $B_1$. The bypass valve 8 is controlled based upon the bypass valve opening degree demand signal $S_{15}$. An adder 75 inputs the steam flow demand signal $S_{11}$, the speed adjusting signal $S_{13}$ and a bias signal $B_2$ and it outputs a signal $S_{16}$. The signal $S_{16}$ corresponds to the nuclear reactor power setting value prepared at the nuclear reactor power setting device 47. The signal $S_{16}$ is transmitted to the low value priority circuit 48 of the output control device 30A.

The output control device 30A of FIGS. 17-19 functions substantially the same as the output control device 30 shown in FIGS. 1 and 2. In more detail, the function obtained by the operation mode switch 40A is added. With the operation mode switch 40A, the effects produced by the embodiment of FIG. 1 are obtained.

The present invention is applicable to a boiling water type nuclear reactor having a recirculation piping system other than the RIP. Namely, by controlling a recirculation pump disposed in the recirculation piping system with the control signal $R_1$, by step 61F processing signal $S_3$ of FIG. 4, output from the recirculation flow control device 61, the same functions as the above embodiments are obtained.

Since the second pump is reduced in speed based upon a trip signal that is generated when the first pump is tripped, the decrease of the steam flow at the moment of the feed water pump trip is hastened and the possibility of the nuclear reactor scram is decreased.

Since the first operation for decreasing the nuclear reactor power to a first fixed value by speed reduction of the second pump and the second operation for reducing the nuclear reactor power to a second fixed value that is lower than the first fixed value are performed, the decrease degree of the steam flow at the moment of the feed water pump trip is suppressed without unnecessarily increasing.

Since the nuclear reactor power is decreased to a level that prevents overspeed of the other first pumps under operation, the overspeed of the first pumps under operation is prevented.

Since the set value of the nuclear reactor power is switched to a second fixed value that is lower than a first fixed value used at the moment of the first pump trip, the nuclear reactor power reduction control after the speed reduction of the second pump is facilitated.

While a preferred embodiment has been described with variations, further embodiments, variations and modifications are contemplated within the spirit and scope of the following claims.

We claim:

1. A boiling water type nuclear reactor power control method, comprising the steps of:
    feeding water with a plurality of first pumps to the nuclear reactor;
    generating a trip signal when one of the first pumps supplying feed water to the nuclear reactor is tripped; and
    controlling the nuclear reactor power to be at a first value of at least 80 percent of rated output power prior to any of said first pumps being tripped and reducing the power in the nuclear reactor in response to the trip signal by first decreasing the speed of a recirculation pump providing core flow to a core of the nuclear reactor to provide a core flow corresponding to a nuclear reactor power of a second value less than said first value.

2. A nuclear reactor power control method according to claim 1, wherein said reducing reduces the nuclear reactor power in accordance with a mismatched amount between the flow of steam discharged from the nuclear reactor and the flow of the feed water.

3. The nuclear reactor power control method of claim 1, wherein said reducing further includes adjusting selected control rods based upon a mismatched amount between a flow of the steam discharged from the nuclear reactor and the flow of the feed water.

4. The nuclear reactor power control method of claim 1, wherein said reducing reduces the nuclear reactor power to a level that prevents overspeed of the other first pumps under operation to supply feed water.

5. A nuclear reactor power control device for a boiling water type nuclear reactor, comprising:
    a plurality of first pump means for feeding feed water to the nuclear reactor;
    trip detection means for outputting a trip signal when one of the first pump means for supplying feed water to the nuclear reactor is tripped, said nuclear reactor operating at a predetermined first level of nuclear reactor power when said one of the first pump means is tripped;
    first control means responsive to said trip signal;
    reduction means responsive to said first control means for reducing circulation of core flow in the core of the nuclear reactor sufficiently to reduce power;
    said first control means controlling said reduction means to first reduce the circulation of core flow in response to said trip signal;
    second reduction means including a variation means for determining and generating a mismatched amount corresponding to a difference between the flow of steam discharged from said nuclear reactor and the flow of the feed water after the trip signal is generated, and
    second control means for controlling and reducing the nuclear reactor power to a predetermined second level from said first level based upon the mismatched amount.

6. The nuclear reactor power control device of claim 5, including:
    means for determining and generating a mismatched amount corresponding to a difference between the flow of steam discharged from said nuclear reactor and the flow of the feed water after the trip signal is generated, and
    means for controlling the nuclear reactor power based upon the mismatched amount.

7. The nuclear reactor power control device of claim 5, wherein said reduction means includes means to output a control signal to reduce the nuclear reactor power to a level that prevents overspeed of other ones of said first pump means still in operation and means for controlling the nuclear reactor power based upon the control signal.

8. The nuclear reactor power control device of claim 5, wherein said trip detection means sets the trip signal to a value to reduce the nuclear reactor power to a fixed value having a lower level than the nuclear reactor power at the moment of the output of the trip signal.

9. A nuclear reactor power control device according to claim 5, wherein said means for controlling the nuclear reactor power is means for controlling insertion of selected control rods into the core.

10. A nuclear reactor power control device for a boiling water type nuclear reactor, comprising:
    a plurality of first pumps for supplying feed water to the nuclear reactor;
    a second pump circulating cooling water in the core in said nuclear reactor;
    trip detection means for generating a trip signal when one of said first pumps is tripped;
    first output control means to output a first control signal for operating the nuclear reactor at a first level of power when none of said first pumps is tripped;
    second output control means to output a second control signal for operating the nuclear reactor at a second level of power, less than said first level, when one of said first pumps is tripped;
    selection control means for switching control from said first output control means to said second output control means; and
    reactor power reduction means for first reducing the speed of said second pump in response to generating said trip signal for reducing the nuclear power and then switching said selection control means to further reduce the nuclear reactor power to said second level from said first level.

11. A nuclear reactor power control device according to claim 10, wherein a part of said first output control means is commonly used by said second output control means.

12. A nuclear reactor power control device according to claim 10, including core flow control flow for controlling the speed of said second pump in response to the second control signal, control rods, control rod control means for controlling operation of said control rods. third output control means to output a third control signal for controlling selected control rods with said control rod control means.

13. A nuclear reactor power control device for a boiling water type nuclear reactor, comprising:
   a plurality of first pumps supplying feed water to the nuclear reactor;
   a second pump circulating cooling water in the core in said nuclear reactor;
   trip detection means for generating a trip signal when one of said first pumps is tripped;
   core flow control means for controlling the speed of said second pump;
   control rods mounted for insertion into the core;
   control rod control means for controlling operation of said control rods;
   first output control means to output a first control signal for operating the nuclear reactor at a first level of power when none of said first pumps is tripped;
   second output control means to output a second control signal for operating the nuclear reactor at a second level of power;
   said core flow control means controlling said second pump based upon the output signal from said second output control means and said first output control means;
   said control rod control means controlling selected control rods based on the output signal of said second output control means and said first output control means; and
   reactor power reduction means for first reducing the speed of said second pump in response to generating said trip signal and then switching operation to said second control means to further reduce the nuclear reactor power to said second level from said first level.

14. A method for controlling reactor power of a boiling water type nuclear reactor, comprising:
   controlling nuclear reactor power in response to a first nuclear reactor power level set at a first predetermined value corresponding to a required output of a generator driven by the nuclear reactor under normal operation of a feed water supplying system;
   detecting an abnormality in the feed water supplying system;
   reducing the nuclear reactor power by first decreasing core flow in response to said detecting of the abnormality; and then
   switching the nuclear reactor power level to a predetermined second level lower than said first level and corresponding to the specific abnormality detected, and continuing said controlling at the lower level.

15. A method for controlling reactor power of a boiling water type nuclear reactor, comprising:
   operating said nuclear reactor at a predetermined first level of power;
   detecting an abnormality of the feed water supplying system for the nuclear reactor;
   first reducing speed of a pump circulating cooling liquid in the core in the nuclear reactor when the abnormality is detected;
   thereafter, detecting a mismatched amount between flow of steam discharged from the nuclear reactor and flow of the feed water; and then
   reducing the nuclear reactor power to a predetermined second level of power less than said first level after said reducing speed step based upon the mismatched amount.

16. A method for controlling reactor power of a boiling water type nuclear reactor in response to an abnormality of a feed water supplying system, comprising:
   operating said nuclear reactor at a predetermined first level of power
   detecting an abnormality by only measuring characteristics of the feed water supplying system, which cause a flow of feed water to decrease abnormally;
   reducing the nuclear reactor power in response to said detected abnormality by first reducing a speed of a recirculation pump providing core flow to a core in the nuclear reactor to a speed corresponding to a nuclear reactor power lower than said first nuclear reactor power; and
   thereafter, further reducing said nuclear reactor power to a predetermined second level lower than said first level of nuclear reactor power.

17. A method for controlling reactor power of a boiling water type nuclear reactor in response to an abnormality of a feed water supplying system, said feed water being supplied by a plurality of pumps, comprising:
   operating said nuclear reactor at a predetermined first level of power;
   detecting an abnormality of the feed water supplying system;
   first reducing recirculation cooling flow within a core of the nuclear reactor, when the abnormality is detected, to a core flow corresponding to a nuclear reactor power lower than said first level by decreasing a speed of a pump providing recirculating cooling water in the core of the nuclear reactor; and
   thereafter further reducing nuclear reactor power to a predetermined second level less than said first level that prevents over speed of the others of the pumps that remain operating for supplying feed water.

* * * * *